(12) United States Patent
Tuet et al.

(10) Patent No.: US 9,688,463 B2
(45) Date of Patent: Jun. 27, 2017

(54) FUEL CELL PACKAGE AND METHOD OF PACKING AND UNPACKING FUEL CELL COMPONENTS

(71) Applicant: BLOOM ENERGY CORPORATION, Sunnyvale, CA (US)

(72) Inventors: Philip Tuet, Sunnyvale, CA (US); Jon Lai, Sunnyvale, CA (US); Lester Lim, Sunnyvale, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 34 days.

(21) Appl. No.: 14/671,156

(22) Filed: Mar. 27, 2015

(65) Prior Publication Data
US 2015/0274410 A1    Oct. 1, 2015

Related U.S. Application Data

(60) Provisional application No. 61/971,700, filed on Mar. 28, 2014.

(51) Int. Cl.
*B65B 5/06*    (2006.01)
*B65B 5/10*    (2006.01)
(Continued)

(52) U.S. Cl.
CPC ........... *B65D 85/62* (2013.01); *B65D 77/042* (2013.01); *B65D 81/07* (2013.01); *B65D 2577/042* (2013.01); *H01M 8/2475* (2013.01)

(58) Field of Classification Search
CPC .. B65B 5/06; B65B 5/10; B65B 23/00; B65B 25/00; B65B 35/50; B65B 5/00;
(Continued)

(56) References Cited

U.S. PATENT DOCUMENTS 3,516,596 A * 6/1970 Madden .................. B65D 5/56
  206/499
4,826,012 A * 5/1989 Kosanovich ....... B65D 5/48038
  206/499
(Continued)

OTHER PUBLICATIONS

International Preliminary Report on Patentability and Written Opinion of the International Searching Authority for International Application No. PCT/US2015/023013, mailing date Oct. 13, 2016, (7 pages).
(Continued)

*Primary Examiner* — Andrew M Tecco
*Assistant Examiner* — Praachi M Pathak
(74) *Attorney, Agent, or Firm* — The Marbury Law Group PLLC

(57) ABSTRACT

A package for transporting fuel cell components is provided. The package includes a carton and one or more boxes configured to be placed in the carton. The package also includes one or more boxes configured to be placed in the carton. The package also includes one or more top inserts configured to be inserted into the boxes, each top insert including a top portion and at least one side portion. The package also includes a plurality of interleaves configured to be placed alternately with the fuel cell components in a stack within each box, wherein each top insert is configured to be inserted into one of the boxes to substantially enclose the stack. The package further includes a plurality of springs, wherein each box includes at least one spring configured to be located at least one of a top end and a bottom end of the stack.

6 Claims, 7 Drawing Sheets

(51) Int. Cl.
*B65B 23/00* (2006.01)
*B65B 25/00* (2006.01)
*B65B 35/50* (2006.01)
*B65B 43/10* (2006.01)
*B65D 85/62* (2006.01)
*H01M 8/24* (2016.01)
*B65D 77/04* (2006.01)
*B65D 81/07* (2006.01)
*H01M 8/2475* (2016.01)

(58) Field of Classification Search
CPC ........... B65B 7/00; B65B 43/00; B65B 43/10; B65D 85/62; H01M 8/2475
USPC ......... 53/445, 447, 474, 475, 449, 156, 157, 53/171
See application file for complete search history.

(56) References Cited

U.S. PATENT DOCUMENTS

| | | | | |
|---|---|---|---|---|
| 5,160,025 | A * | 11/1992 | Greenawald | B65D 5/56 206/204 |
| 5,226,555 | A * | 7/1993 | Kovaleski | B65D 5/566 206/521 |
| 5,441,170 | A * | 8/1995 | Bane, III | B65D 5/48024 206/523 |
| 5,615,795 | A * | 4/1997 | Tipps | B65D 5/28 206/523 |
| 7,494,014 | B2 * | 2/2009 | Martinez | B65D 5/48032 206/499 |
| 8,820,532 | B2 * | 9/2014 | Shannon | H01M 2/02 206/204 |
| 8,962,219 | B2 * | 2/2015 | Couse | H01M 8/0258 429/457 |
| 2006/0261304 | A1 * | 11/2006 | Muthukumaran | H01M 8/04007 252/62 |
| 2008/0302692 | A1 * | 12/2008 | Dubosq | B65D 71/066 206/427 |
| 2010/0031498 | A1 * | 2/2010 | Rober | H01M 8/247 29/623.1 |
| 2013/0140213 | A1 * | 6/2013 | Padden | B65D 81/022 206/587 |
| 2013/0192169 | A1 * | 8/2013 | Rodriguez | B65D 5/46088 53/461 |
| 2013/0266848 | A1 * | 10/2013 | Shannon | H01M 2/02 429/176 |
| 2013/0277263 | A1 * | 10/2013 | Jung | B65D 15/00 206/459.5 |
| 2015/0274410 | A1 * | 10/2015 | Tuet | B65D 85/62 206/723 |
| 2016/0365598 | A1 * | 12/2016 | Ju | H01M 8/2404 |
| 2017/0021960 | A1 * | 1/2017 | Whiteside | B65D 5/5028 |

OTHER PUBLICATIONS

International Search Report and Written Opinion for PCT/US2015/023013, mailing date Jun. 26, 2015, (10 pages).

* cited by examiner

FUEL CELL PACKAGE AND METHOD OF PACKING AND UNPACKING FUEL CELL COMPONENTS

The present application claims benefit of priority of U.S. Provisional patent application Serial Number 61/971,700 filed on Mar. 28, 2014, which is incorporated herein by reference in its entirety.

FIELD

The present disclosure generally relates to a package design, and more particularly, to a recyclable package design for the shipping, transport, and handling, both automated and manual, of fuel cell components such as interconnect plates, end plates, electrolytes, and fuel cell stack subassemblies.

BACKGROUND

Fuel cell components, such as interconnect plates, end plates, electrolytes, and fuel cell stack subassemblies, when shipped, transported, or handled, may be placed in a box, such as a carton box generally available on the market for moving. However, these carton boxes are not specifically designed for fuel cell components. As a result, fuel cell components may move around during transportation or handling and may subject to vibration or impact. Damage may occur to the fuel cell components during transportation or handling. Therefore, there is a need for an improved recyclable package design for shipping, transporting, and handling (manually or automatically) fuel cell components.

SUMMARY

In one aspect, the present disclosure relates to a package for transporting fuel cell components is provided. The package includes one or more boxes configured to be placed in a container. The package also includes one or more top inserts configured to be inserted into the boxes, each top insert including a top portion and at least one side portion. The package also includes a plurality of interleaves configured to be placed alternately with the fuel cell components in a stack within each box, wherein each top insert is configured to be inserted into one of the boxes to substantially enclose the stack. The package further includes a plurality of springs, wherein each box includes at least one spring configured to be located at least one of a top end and a bottom end of the stack.

In another aspect, the present disclosure relates to a method of packaging fuel cell components. The method includes placing a first spring over a top portion of an open top insert, the top insert also including at least one side portion. The method includes stacking the fuel cell components and interleaves alternately on the first spring. The method also includes folding the at least one side portion of the top insert to a substantially upright position to enclose the stacked fuel cell components and the interleaves. The method also includes sliding a box onto the stacked fuel cell components and the interleaves. The method also includes flipping the box and placing the box in a container.

In another aspect, the present disclosure relates to a method of unpacking a stack of fuel cell components and interleaves from a package including a plurality of boxes. The method includes opening a container of the package that contains the plurality of boxes. The method also includes removing the plurality of boxes from the container. The method also includes for each box, removing a top insert from a top end of the stack of the fuel cell components and interleaves. The method also includes for each box, removing a spring from the box to expose the stack of the fuel cell components and the interleaves. The method further includes for each box, removing the fuel cell components and the interleaves from the box.

BRIEF DESCRIPTION OF THE DRAWINGS

The accompanying drawings, which are incorporated herein and constitute part of this specification, illustrate examples of the disclosed devices and methods, and together with the general description given above and the detailed description given below, serve to explain the features of the invention.

DETAILED DESCRIPTION

The various examples will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims. It is also understood that the examples shown in the figures are not mutually exclusive. Features shown in one example (e.g., in one figure) may be included in other examples (e.g., in other figures).

A shippable, clean, secure, ergonomic, and recyclable package is provided for the use of transporting fuel cell components safely and without damage via plane, boat, or truck. The design is scalable for use in varying sized components.

Figure 1:
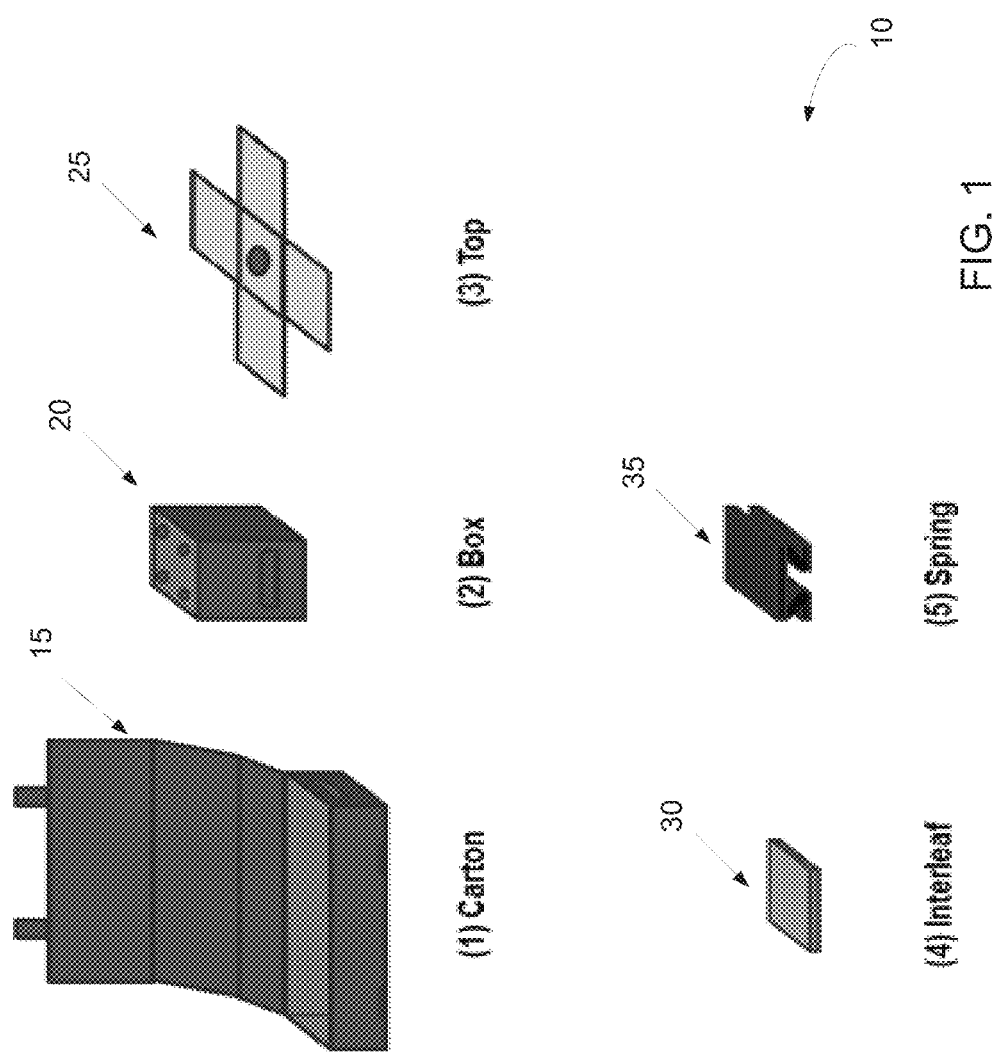
FIG. 1 is perspective view of components of a package according to the present disclosure.

FIG. 1 shows an exemplary kit or bill of materials of a package 10 configured for handling or transporting fuel cell components. The package 10 may be made of a recyclable material, or may be made of a non-recyclable material but may be recycled for reuse. In some embodiments, most or all of the components shown in FIG. 1 may be made of a recyclable material. Thus, the package 10 may be referred to as a recyclable package 10.

The package 10 may include a container, such as a carton 15 and at least one of a box 20, a top insert 25, an interleaf 30, and a spring 35. In some embodiments, the package 10 may include more than one box 20, such as, for example, two, three, four, etc. At least one of the carton 15, box 20, top insert 25, interleaf 30, and the spring 35 may be made of a suitable material, such as cardboard, foam, plastic, etc. In some embodiments, the package 10 may include more than one top insert 25, such as, for example, two, three, four, etc. In some embodiments, the package 10 may include more than one interleaves 30, such as, for example, ten, twenty, thirty, forty, fifty, sixty, seventy, eighty, ninety, one hundred, etc. In one embodiment, the package 10 may include ninety nine interleaves 30 for transporting the fuel cell components such as one hundred fuel cell components for example. In some embodiments, the package 10 may include more than one spring 35, such as, for example, two, three, four, five, six, etc.

In an alternative embodiment, any other container besides the carton 15 may be used, and a plurality of the boxes 20 may be shipped in any other container, such as a wood crate or a plastic box.

In one embodiment, for one hundred fuel cell components, such as interconnect plates of dimensions approximately 100 mm×100 mm, the materials included in the package 10 may include one carton 15, three boxes 20, three top inserts 25, ninety-nine interleaves 30, and six springs 35. The dimension of the package 10 may be customized based on the dimension of the fuel cell components to be transported.

In alternative embodiments, the fuel cell components may comprise the fuel cells themselves or fuel cell stacks. For example, the fuel cell components may comprise planar (i.e., plate shaped) solid oxide fuel cells, such as planar electrolyte supported solid oxide fuel cells having an ceramic electrolyte containing thin anode and cathode electrodes located on opposite sides of the plate shaped electrolyte. The fuel cell stacks may include a stack of alternating interconnects and fuel cells, such as metal interconnects and solid oxide fuel cells, which are sealed together by glass or glass ceramic seals.

Figure 2:
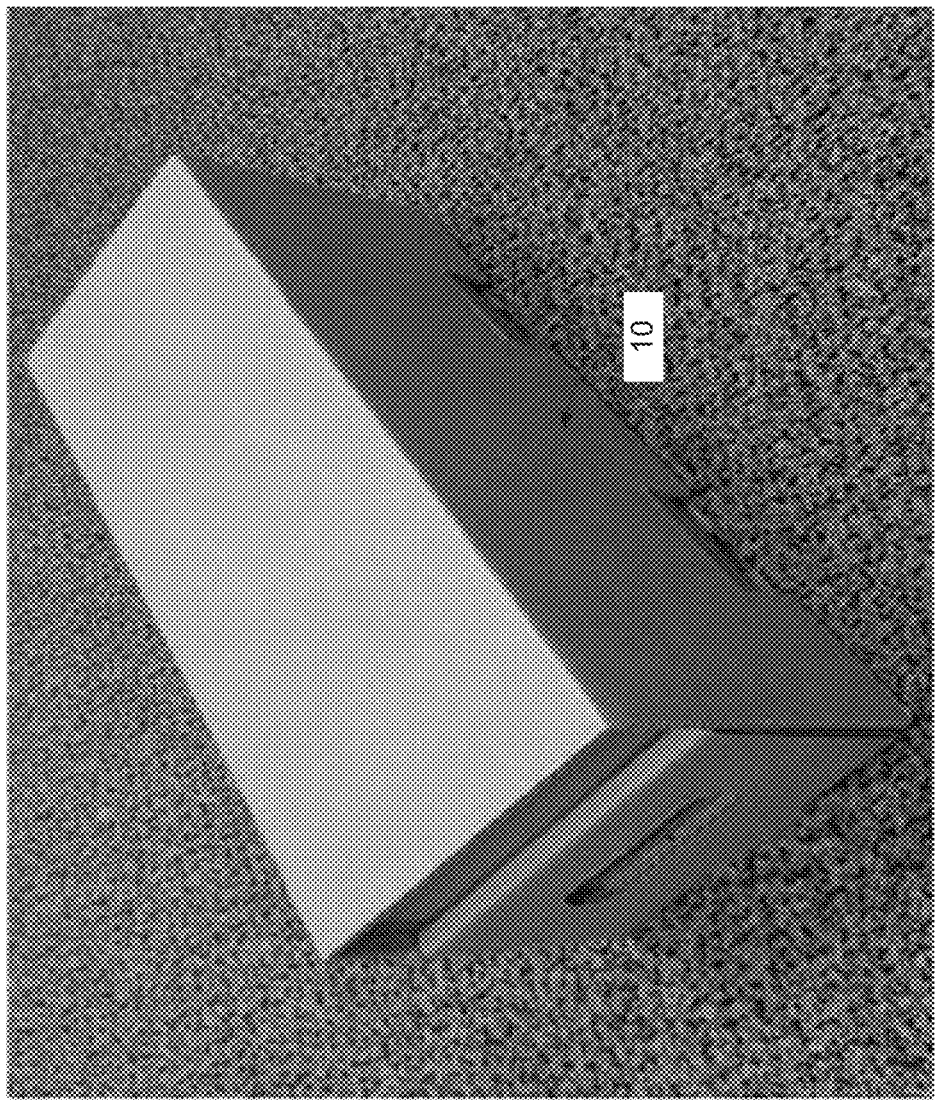
FIG. 2 shows a photo of an exemplary package in a closed state according to the present disclosure.
Figure 3:
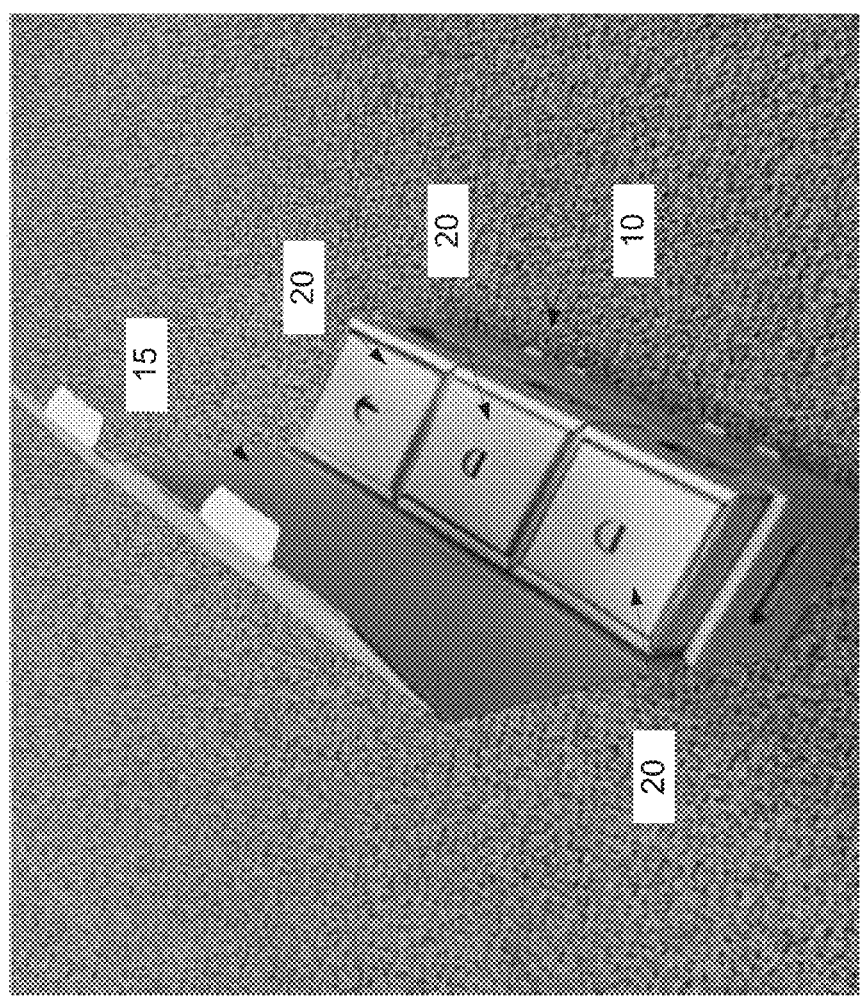
FIG. 3 shows a photo of an exemplary package in an open state according to the present disclosure.

FIG. 2 shows a photo of an exemplary package 10 in a closed state. FIG. 3 shows a photo of an exemplary package 10 in an open state. As shown in FIG. 3, in one embodiment, the package 10 may include a carton 15 containing three boxes 20 for transporting or handling fuel cell components, such as interconnect plates, fuel cells or fuel cell stacks. Interconnect plates may comprise chromium alloy (e.g., Cr containing 4-6 wt % Fe alloy) interconnects containing ribs and grooves on both sides for gas (e.g., air and fuel) flow and optionally riser openings for solid oxide fuel cell stacks.

Figure 4:
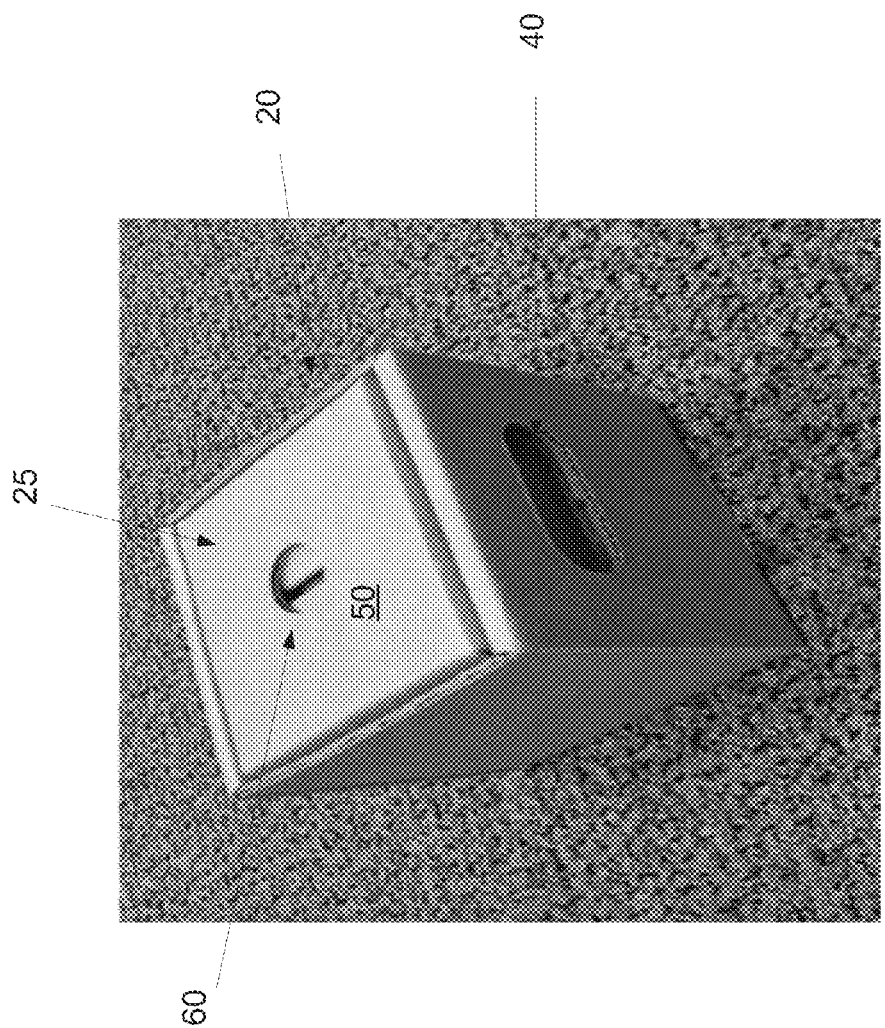
FIG. 4 shows a photo of an exemplary box included in the package in a closed state according to the present disclosure.

FIG. 4 shows a photo of an exemplary box 20 shown in FIGS. 1-3 that may be included in the package 10 in a closed state. As shown in FIG. 4, the top insert 25 shown in FIG. 1 is folded and inserted into the box 20 to cover the top portion of the fuel cell components contained within the box 20. As shown in FIG. 4, each box 20 may include a handling cavity 40 on each of two opposite sides of the box 20 for handling of the box 20 (the handling cavity 40 on the other side is shown in FIG. 5).

Figure 5:
FIG. 5 shows a photo of an exemplary box included in the package in an open state according to the present disclosure.

FIG. 5 shows a photo of an exemplary box 20 shown in FIGS. 1-3 that may be included in the package 10 in an open state. The content of the box 20 are taken out and placed upside down next to the empty box 20 for illustrative purposes. As also shown in FIG. 5, the box 20 may be configured to transport a stack of fuel cell components 45 and interleaves 30 placed in an alternate fashion. One or more interleaves 30 may be inserted between two adjacent fuel cell components 45, such as interconnect plates or fuel cells.

A first spring 35 shown in FIG. 1 may be placed at the bottom end of the stack of fuel cell components 45 and interleaves 30. The first spring 35 may be made of cardboard, foam, or plastic that is folded into a suitable shape, such as the shape shown in FIGS. 1 and 5. The first spring 35 may function as a vibration absorber to absorb or reduce vibration or impact transmitted from the bottom of the box 20, thereby protecting the fuel cell components 45 from damage that may be caused by vibration or impact. In some embodiments, a second spring 35 may be placed at the top end of the stack of fuel cell components 45 and interleaves 30. The second spring 35 may be placed between the top end of the stack and the top insert 25. The second spring 35 may also function as a vibration or impact absorber to absorb or reduce the vibration or impact from the top of the box 20. The first and second springs 35 placed at the top and bottom ends of the stack of fuel cell components 45 and interleaves 30 are also configured to secure the position of the fuel cell components 45, preventing or reducing the vertical movement of the fuel cell components 45.

As shown in FIG. 4, the top insert 25 may include a top portion 50. As shown in FIG. 5, the top insert 25 may include four side portions 55 connected to the top portion 50. The four side portions 55 may not be directly connected to one another. Also as shown in FIG. 4, the top portion 50 may include a hole 60. The hole 60 may be located at a suitable location, such as the center location of the top portion 50. The hole 60 may enable a user to grab the top portion 50 and remove the top insert 25 from the box 20. When used with the box 20, the top portion 50 may be placed on top of the stack of fuel cell components 45 and interleaves 30, as shown in FIG. 4, and the four side portions 55 may be folded and inserted into the space between the stack of fuel cell components 45 and interleaves 30 and the four sides of the box 20. The top insert 25 may help secure the fuel cell components 45 by limiting the lateral movement of the fuel cell components 45. The top insert 25 may also absorb or reduce lateral vibration or impact from the sides of the box 20, thereby protecting the fuel cell components 45 from damage that may be caused by vibration or impact.

The box 20 may have a shape that matches the shape of the cross section of the fuel cell components 45. The cross section of the fuel cell components 45 may have any suitable shape, such as a rectangular shape, a square shape, a triangle shape, a polygon shape, etc. The box 20 and the top portion 50 of the top insert 25 may each have a shape that matches the shape of the cross section of the fuel cell components 45. Depending on the shape of the top portion 50, the top insert 25 may include other number of side potions 55, such as two, three, five, six, etc. The interleaves 30 may have shapes that match the shape of the cross section of the fuel cell components 45.

Figure 6:
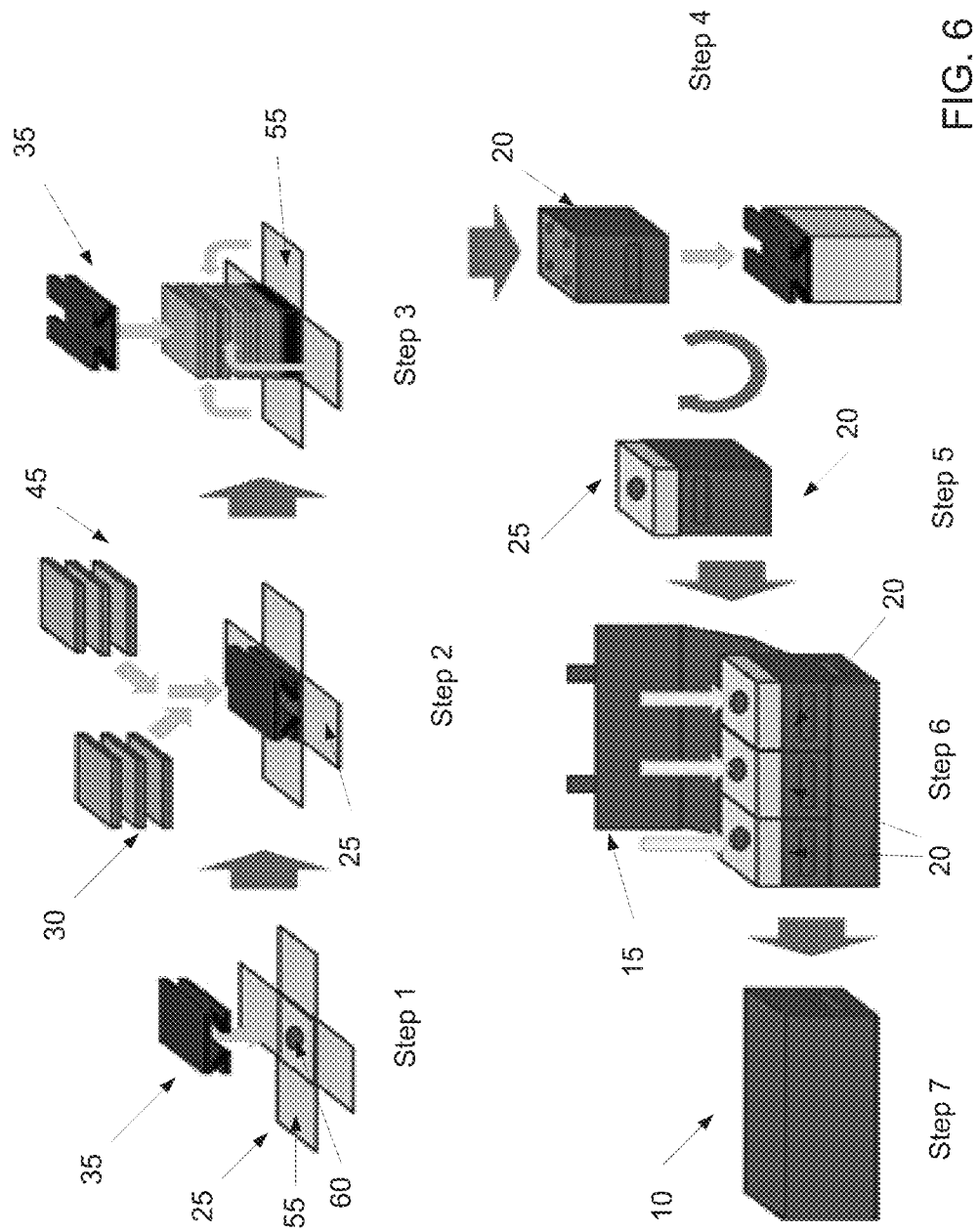
FIG. 6 schematically shows a loading process of packing the fuel cell components into a package according to the present disclosure.

FIG. 6 shows an exemplary loading process or packaging process for packing the fuel cell components into the package 10. At step 1, a top insert 25 may be placed on a flat surface in an open state with the four side portions 55 unfolded. For example, the four side portions 55 may be in the open state such that they are in parallel with the top portion 50. As another example, the four side portions 55 may be in an open state such that they are not folded upright. A first spring 35 may be placed onto the top portion 50 of the top insert 25. At step 2, fuel cell components 45, such as interconnect plates, fuel cells or fuel cell stacks, and interleaves 30 may be stacked together alternately on the first spring 35, with one or more interleaves 30 being placed between two adjacent fuel cell components 45. At step 3, the four side portions 55 of the top insert 25 may be folded up to a substantially upright position (e.g., substantially perpendicular to the top portion 50) to substantially enclose the stack of fuel cell components 45 and interleaves 30. A second spring 35 may be placed at the top of the stack to cover the stack. In some embodiments, the last piece at the top of the stack may be an interleaf or a fuel cell component, and the second spring 35 may be placed on the last piece at the top of the stack. In some embodiments, the second spring 35 may not be used.

Referring to FIG. 6, at step 4, a box 20 is slid over the top of the second spring 35 and to cover the stack of fuel cell components 45 and interleaves 30, which are substantially enclosed by the four side portions 55 of the top insert 25. At step 5, the box 20 is flipped (e.g., turned upside down) such that the top portion 50 of the top insert 25 appears on the top. At step 6, three boxes 20 are placed into a carton 15, with the top portion 25 appearing on the top in each box. At step 7, a lid of the carton 15 is closed to form a package 10.

Figure 7:
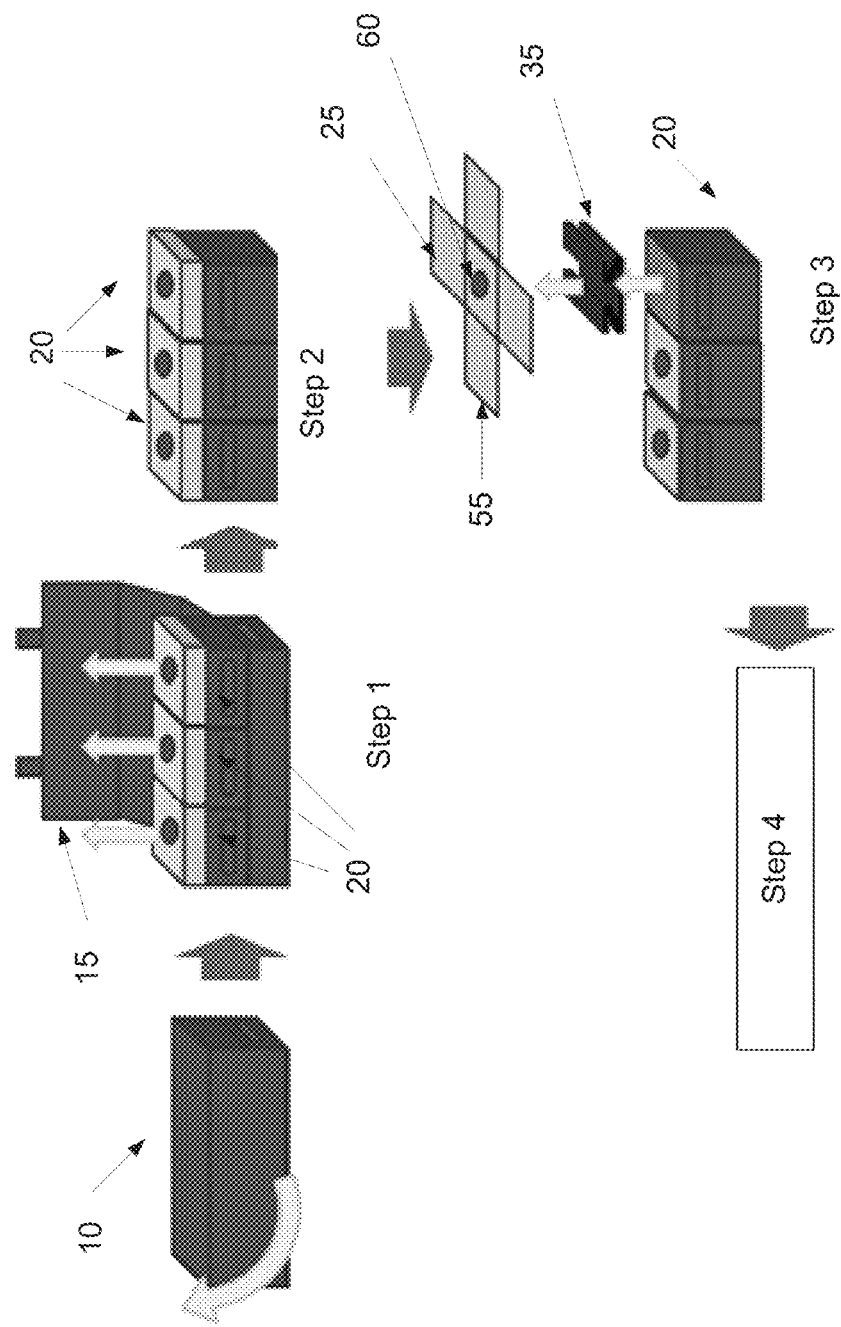
FIG. 7 schematically shows an unloading process of unpacking the package according to the present disclosure.

FIG. 7 shows an exemplary unloading process or unpacking process of the package 10 formed by the loading process of FIG. 6. At step 1, the carton 15 is opened by lifting up the lid of the carton 15. At step 2, the boxes 20 are removed from the carton 15. At step 3, for each box 20, the top insert 25 and the first spring 35 are removed to expose the stack comprised of fuel cell components 45 (such as interconnect plates, fuel cells or fuel cell stacks) and interleaves 30. To remove the top insert 25, the user may grab the hole 60 located on the top portion 50 and pull the top insert 25 out of the box 20. The first spring 35 may be removed after the top insert 25 has been removed. At step 4, the fuel cell components 45 are picked up through an automatic or manual process for use. For example, the interconnects or fuel cells 45 may be placed into a fuel cell stack, such as a solid oxide fuel cell stack such that each interconnect separates two adjacent solid oxide fuel cells in the stack. Although not shown, the box 20 may include a hole at a bottom side. The user may insert a rod or pin into the hole of the box 20 and push the fuel cell components 45 up out of the box 20 for easy removal.

The functional operation of the package 10 is to safely contain the fuel cell components 45 during transport and handling. To test this, a prototype package loaded with sixty total plates (20 plates per box) was subjected to an International Safe Transit Association simulation, specifically ISTA 3A—Packaged-Products for Parcel Delivery System Shipment 70 kg (150 lb) or less. The test includes several package drops from varying heights and angles along with time on a random vibration with and without a top load.

The plates (e.g., Cr-Fe interconnects containing ribs and grooves for gas flow and optionally fuel riser openings for solid oxide fuel cell stacks) are visually inspected both before and after testing to determine the efficacy of the design to protect its contents.

In a non-limiting example, two solid oxide fuel cell stacks were loaded into boxes 20, which were placed into a small wood crate and shipped via air freight without using the carton 15. Both stacks arrived at the destination unharmed.

Three recyclable types of interleaves (F-flute, E-flute, and chipboard) were tested. Of the three, the E-flute provided the best protection leaving no indication of visual damage to the plates. The F-flute left a white shadow residue of some plates along with abrasive chipping. The chipboard embedded fluffy brown material onto the plates.

Overall, the package protected most of the plates to the end user's standards with no breakage. The carton only suffered one minor tear and cosmetic superficial crushing along certain corners.

Alternate embodiments may include changes to the physical (x,y,z) dimensions of the carton, box, top, interleaf, and spring to accommodate different sized components and stacks. Varying the number of interleaves allows for the flexibility of packing any number from one to the maximum amount of components that will fit in a box. Varying the type of recyclable material, such as plastics or biodegradables, used for the bill of materials will allow for more options in cost and packing density.

Non-limiting sizes for the package 10 described above may be: carton 15 (275# Kraft B Flute 15.3"×15.8"), box 20 (275# Kraft B Flute 4.8"×4.8"), top insert 25 (275# Kraft B Flute 4.7"×4.7"), interleaf 30 (Kraft E Flute 3.9"×3.9"), and spring 35 (275# Kraft B Flute 3.9"×11.7").

All or most of the components of package 10 are recyclable. Coin stack arrangement of parts increases packing density which adds structural strength and lowers shipping costs. Flexibility in shipping any number of components from 1 to N, where N is the maximum number of components that will fit in a given box, is provided by increasing or decreasing the amount of interleaves 30 as spacers to fill the void space. For example, when the fuel cell components 45 only fill only a portion (e.g., one third) of the capacity of the box 20, the remaining space may be filled by adding more interleaves 30. Depending on the order of steps taken for unloading components from the package, the user has the option of taking components out on a First-In-First-Out (FIFO) basis or Last-In-First-Out (LIFO). Using a single multi-purpose transport package provides the advantages of reduced cost and reduced complexity of maintaining a fleet of different carriers.

The construction and arrangements of the package are illustrative only. Although only a few examples have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative examples. Other substitutions, modifications, changes, and omissions may also be made in the design, operating conditions and arrangement of the various examples without departing from the scope of the present disclosure. Any one or more features of any example may be used in any combination with any one or more other features of one or more other examples. It is intended that the specification and examples be considered as exemplary only, with a true scope being indicated by the following claims and their equivalents.

What is claimed is:

1. A method of packaging fuel cell components, comprising:
    placing a first spring over a top portion of an open top insert, the top insert also including at least one side portion;
    stacking the fuel cell components and interleaves alternately on the first spring;
    folding the at least one side portion of the top insert to a substantially upright position to enclose the stacked fuel cell components and the interleaves;
    sliding a box onto the stacked fuel cell components and the interleaves;
    flipping the box; and
    placing the box in a container.

2. The method of claim 1, wherein:
    the container comprises a carton, a wood crate or a plastic box; and flipping the box comprises flipping the box upside down such that the top portion of the top insert appear on the top of the box.

3. The method of claim 2, wherein the container comprises the carton, and further comprising closing the carton after a plurality of boxes are placed in the carton.

4. The method of claim 1, further comprising placing a second spring on a top end the stacked fuel cell components and the interleaves before sliding the box onto the stacked fuel cell components and the interleaves.

5. The method of claim 2, wherein the carton, the one or more boxes, the one or more top inserts and the one or more springs are made from cardboard, foam or plastic, and the fuel cell components comprise metal alloy fuel cell stack interconnect plates.

6. The method of claim 1, further comprising transporting the package containing the packaged fuel cell components, unpacking the fuel cell components from the package, and placing the fuel cell components into a fuel cell stack.

* * * * *